(12) United States Patent
Aaron et al.

(10) Patent No.: US 8,090,353 B2
(45) Date of Patent: Jan. 3, 2012

(54) METHODS, SYSTEMS AND COMPUTER PROGRAM PRODUCTS FOR FEATURE AND PROFILE MANAGEMENT IN PORTABLE ELECTRONIC DEVICES

(75) Inventors: Jeffrey Aaron, Atlanta, GA (US); John Ruckart, Atlanta, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 633 days.

(21) Appl. No.: 11/732,544

(22) Filed: Apr. 4, 2007

(65) Prior Publication Data

US 2008/0246602 A1 Oct. 9, 2008

(51) Int. Cl.
*H04M 3/42* (2006.01)
(52) U.S. Cl. ............... 455/414.1; 704/275; 715/745
(58) Field of Classification Search ............... 455/414.1, 455/414.2, 418, 423, 456.1; 709/203, 217, 709/227; 715/201, 747
See application file for complete search history.

(56) References Cited

U.S. PATENT DOCUMENTS

| | | | | |
|---|---|---|---|---|
| 6,751,626 | B2* | 6/2004 | Brown et al. | 707/101 |
| 6,957,393 | B2* | 10/2005 | Fano et al. | 715/747 |
| 2004/0176958 | A1* | 9/2004 | Salmenkaita et al. | 704/275 |
| 2004/0198331 | A1* | 10/2004 | Coward et al. | 455/414.1 |
| 2006/0107219 | A1* | 5/2006 | Ahya et al. | 715/745 |
| 2006/0248183 | A1* | 11/2006 | Barton | 709/224 |

* cited by examiner

*Primary Examiner* — Kent Chang
*Assistant Examiner* — Dinh Nguyen
(74) *Attorney, Agent, or Firm* — Parks IP Law LLC; Mickki D. Murray, Esq.

(57) ABSTRACT

Methods of managing features in a portable electronic device are provided. Use of a portable electronic device by a user is monitored over a period of time. Adaptive settings are established for features and/or profiles in the portable electronic device based on the monitored use of the portable electronic device. Related system and computer program products are also provided.

2 Claims, 4 Drawing Sheets

METHODS, SYSTEMS AND COMPUTER PROGRAM PRODUCTS FOR FEATURE AND PROFILE MANAGEMENT IN PORTABLE ELECTRONIC DEVICES

FIELD OF THE INVENTION

The present invention generally relates to the field of communications and, more particularly, to communications using portable electronic devices.

BACKGROUND OF THE INVENTION

A wide variety of communications services are available for users. For example, a single user may have a home phone, work phone, and mobile phone. In addition, the user may also use devices such as personal computers (PCs), personal digital assistants (PDAs), and pagers for data communications, such as e-mail and instant messaging.

As communications services develop they offer more functionality and options. As a result, they are becoming more complex to use and manage. For example, a person could use a home phone, cellphone, work phone, e-mail, work e-mail and the like as communications services for different purposes or at different times. In addition, a number of phones and computers could be included in a home or office, thereby providing access to those communications services from different locations in the home or office. Different addresses or identifications could be associated with each of these phones and/or computers or other user input/output devices that may be used in connection with the communications services.

Each of the services and/or devices will typically have its own associated set of features and settings. Managing all these options may be so complicated and annoying for a user, that users may forego taking full advantage of all the features and capabilities available to them. As such, they may perceive the provided services as less valuable and less desirable. They may also fail to add new premium services associated with the features and/or providing new features because of a perceived inability to take advantage of those premium services. Therefore, the ability to market communications services may be adversely affected.

SUMMARY OF THE INVENTION

Some embodiments of the present invention provide methods of managing features in a portable electronic device. Use of a portable electronic device by a user is monitored over a period of time. Adaptive settings are established for features and/or profiles in the portable electronic device based on the monitored use of the portable electronic device.

In further embodiments of the present invention, use of the portable electronic device may be monitored with respect to a location of the portable electronic device when used, a time of day that the portable electronic device is being used and/or a day of the week on which the portable electronic device is being used. The adaptive settings may be established for the features and/or profiles in the portable electronic device based on the location of the portable electronic device when used, the time of day that the portable electronic device is being used and/or the day of the week on which the portable electronic device is being used.

In still further embodiments of the present invention, use of at least one additional portable electronic device by at least one additional user may be monitored over the period of time. The adaptive settings for features and/or profiles may be established based on the monitored use of the at least one additional portable electronic device. In certain embodiments of the present invention, a plurality of suggestions associated with features and/or profiles of the portable electronic device may be provided to the user of the portable electronic device so as to allow the user to select a preferred feature and/or profile. The plurality of suggestions associated with the features and/or profiles of the portable electronic device may be based on the monitored use of the portable electronic device and/or the monitored use of the at least one additional portable electronic device.

In some embodiments of the present invention, the results of the monitored use of the portable electronic device may be stored in a central database so as to allow access to the results by users of other portable electronic devices.

In further embodiments of the present invention, the features and/or profiles of the portable electronic device may be automatically changed responsive to the monitored use of the portable electronic device and/or the monitored use of the at least one additional portable electronic device.

In still further embodiments of the present invention, a plurality of suggestions associated with features and/or profiles of the portable electronic device may be provided to the user of the portable electronic device so as to allow the user to select a preferred feature and/or profile. The plurality of suggestions associated with the features and/or profiles of the portable electronic device may be based on a current location of the portable electronic device.

In some embodiments of the present invention, use of a portable electronic device by a user may be continually monitored and the adaptive settings for features and/or profiles in the portable electronic device may be refined based on the continuous monitored use of the portable electronic device.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE FIGURES

Other features of the present invention will be more readily understood from the following detailed description of exemplary embodiments thereof when read in conjunction with the accompanying drawings, in which.

DETAILED DESCRIPTION OF EMBODIMENTS OF THE INVENTION

Figure 1:
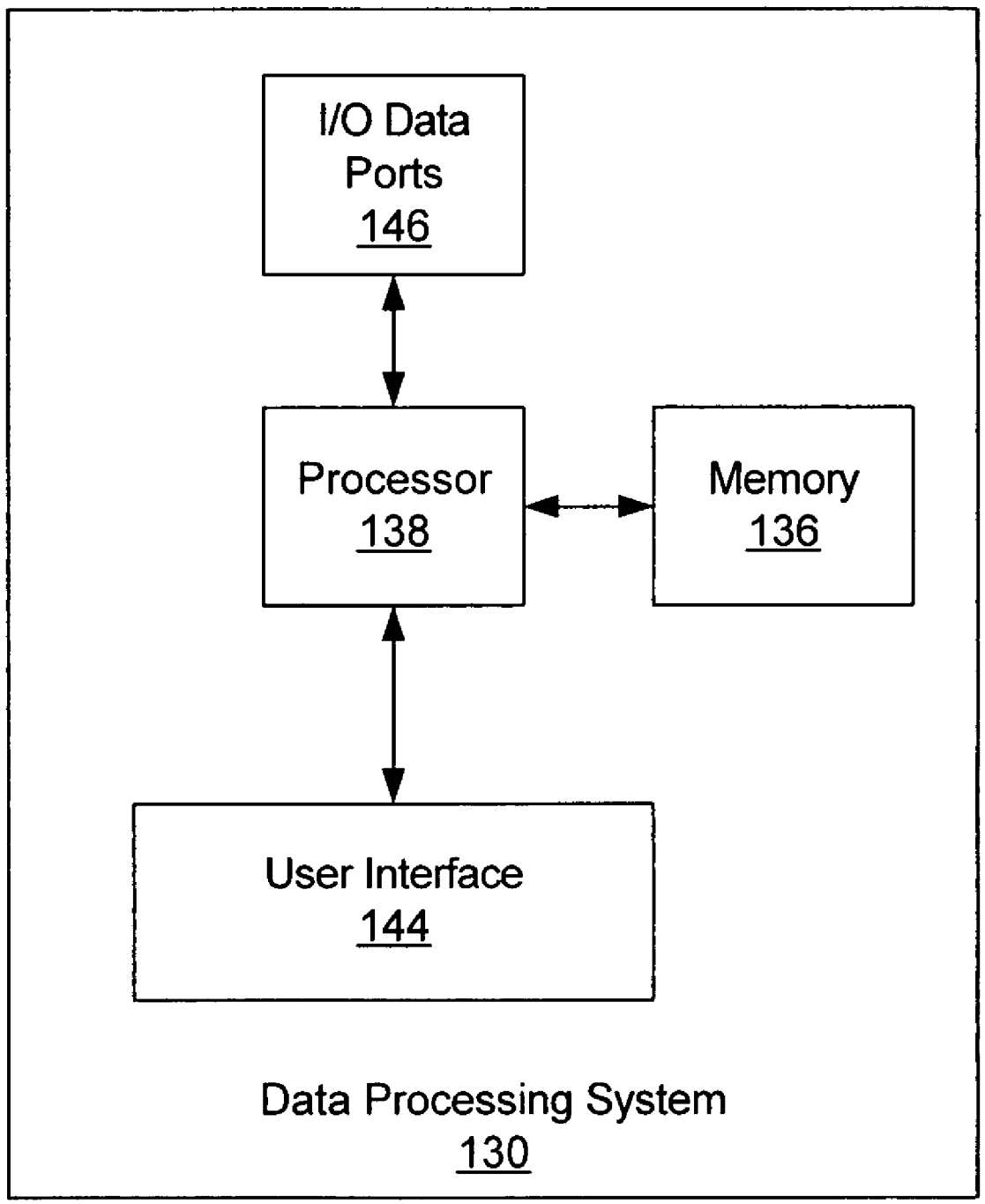
FIG. 1 is a block diagram of a data processing system suitable for use in some embodiments of the present invention.

The present invention now will be described more fully hereinafter with reference to the accompanying figures, in which embodiments of the invention are shown. This invention may, however, be embodied in many alternate forms and should not be construed as limited to the embodiments set forth herein. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

The present invention may be embodied as methods, systems, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention is described below with reference to block diagrams and/or flowchart illustrations of methods, systems and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Portable electronic devices have increased their functions and capabilities so rapidly it may be difficult for consumers to keep up with the relevant knowledge. Call logs, phone profiles, ring tones, voice mail, caller ID, and the like are all valued features, but keeping track of their settings and managing them optimally can become tedious. With devices capable of Internet access, wireless video, location based services, email, short message service (SMS), and/or instant messaging (IM), the user may have more options than they can control.

Thus, according to some embodiments of the present invention, the use of a portable electronic device by a user may be monitored over a period of time and adaptive settings for features and/or profiles in the portable electronic device may be established based on the monitored use of the portable electronic device.

For example, a portable electronic device management system and user interface may be provided. For example, the portable electronic device itself may be configured to monitor user interactions based on things such as a user's location, time of day, day of week, and prioritize the presentation of functions and features of the portable electronic device based on monitored observations. Thus, use of the features/profiles of the portable electronic device may be easier/improved according to some embodiments of the present invention.

As will be discussed further below, according to some embodiments of the present invention, the portable electronic device may be configured to determine a present location of the portable electronic device and present features/profiles of the portable electronic device based on the location. For example, the most often called number at work may be corporate voicemail and so this number may be placed first on the call list of the user's portable electronic device. Similarly, when the user is at home the most used communication may be email, so this function may be made easily accessible by the user.

Furthermore, according to some embodiments of the present invention, a user can define call management settings based on the location of the portable electronic device. For example, when a user is at work, the location being determined by the portable electronic device, calls from the user's personal address book entries may go to voicemail. Similarly, if a user is driving in a car, the portable electronic device may be configured to detect the speed using LBS and send all calls to voicemail and silence most non-critical alerts. Furthermore, if the user enters a movie theater, the portable electronic device could be set to vibrate or silent automatically based on their location at the movie theater as will be discussed further below with respect to FIGS. 1 through 5.

Referring first to FIG. 1, exemplary embodiments of a portable electronic device or data processing system 130 configured in accordance with embodiments of the present invention will be discussed. The data processing system 130, which may be incorporated in, for example, a portable electronic device, such as a personal computer, a PDA, a wireless terminal/phone, a smart appliance or the like, may include a user interface 144, including, for example, input device(s) such as a keyboard or keypad, a display, a speaker and/or microphone, and a memory 136 that communicate with a processor 138. The data processing system 130 may further include I/O data port(s) 146 that also communicates with the processor 138. The I/O data ports 146 can be used to transfer information between the data processing system 130 and another computer system or a network using, for example, an Internet Protocol (IP) connection. These components may be conventional components such as those used in many conventional data processing systems, which may be configured to operate as described herein.

Figure 2:
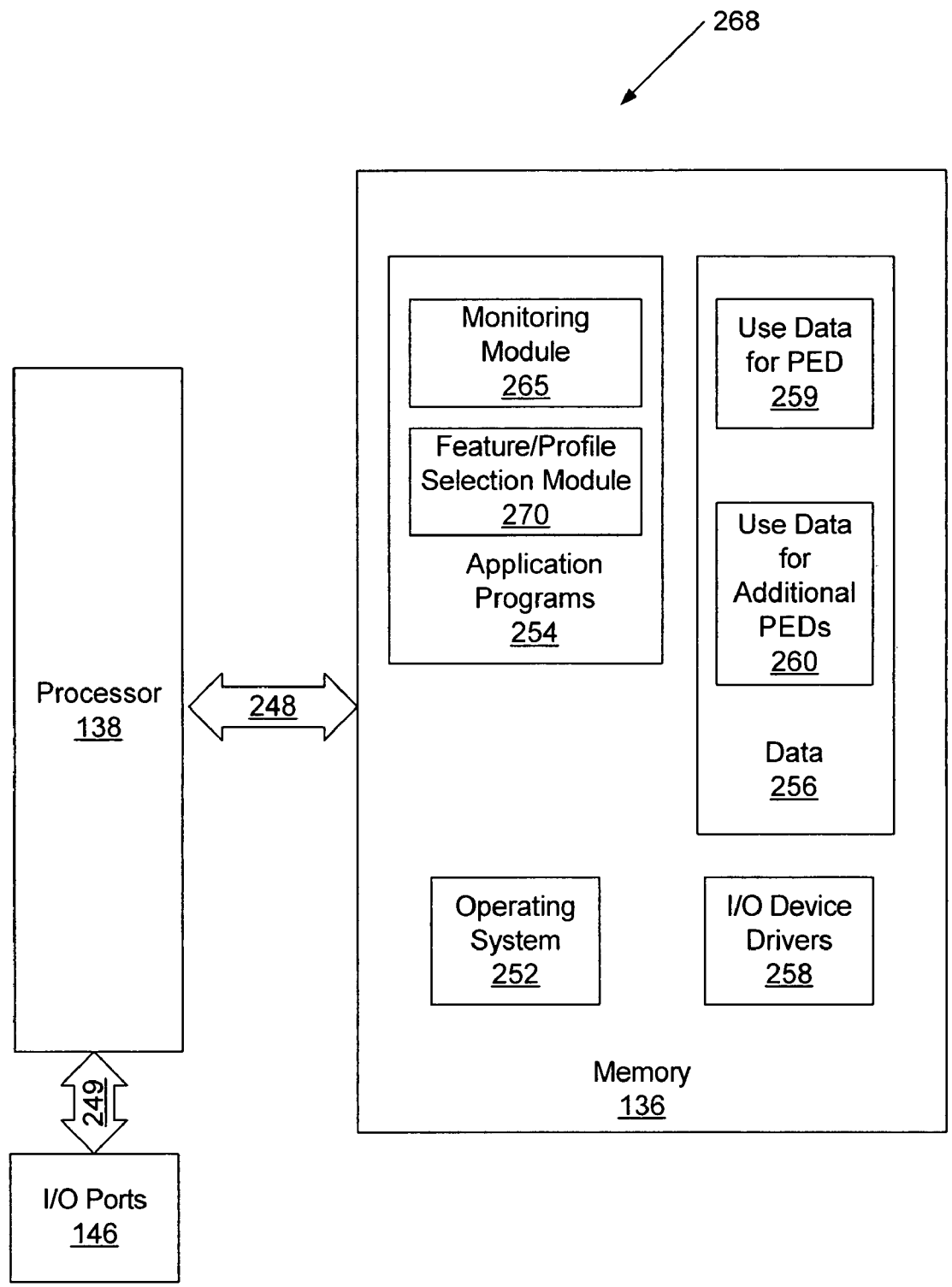
FIG. 2 is a more detailed block diagram of a system according to some embodiments of the present invention.

Referring now to FIG. 2, a more detailed block diagram of a data processing system 268 for managing features in a portable electronic device is provided that illustrates systems, methods, and computer program products in accordance with some embodiments of the present invention will now be discussed. It will be understood that the application programs and data discussed with respect to FIG. 2 below may be present in the portable electronic device, in a remote server or a combination of the two without departing from the scope of the present invention.

As illustrated in FIG. 2, the processor 138 communicates with the memory 136 via an address/data bus 248. The processor 138 can be any commercially available or custom enterprise, application, personal, pervasive and/or embedded microprocessor, microcontroller, digital signal processor or the like. The memory 136 may include any memory device containing the software and data used to implement the functionality of the data processing system 130. The memory 136 can include, but is not limited to, the following types of devices: ROM, PROM, EPROM, EEPROM, flash memory, SRAM, and DRAM.

As further illustrated in FIG. 2, the memory 136 may include several categories of software and data used in the system 268: an operating system 252; application programs 254; input/output (I/O) device drivers 258; and data 256. As will be appreciated by those of skill in the art, the operating system 252 may be any operating system suitable for use with a data processing system, such as OS/2, AIX or zOS from International Business Machines Corporation, Armonk, N.Y., Windows95, Windows98, Windows2000 or WindowsXP, or Windows CE from Microsoft Corporation, Redmond, Wash., Palm OS, Symbian OS, Cisco IOS, VxWorks, Unix or Linux. The I/O device drivers 258 typically include software routines accessed through the operating system 252 by the application programs 254 to communicate with devices such as the I/O data port(s) 146 and certain memory 136 components. The application programs 254 are illustrative of the programs that implement the various features of the system 268 and may include at least one application that supports operations according to embodiments of the present invention. Finally, as illustrated, the data 256 may include use data associated with the portable electronic device 259 and user data associated with other portable electronic devices 260, which may represent the static and dynamic data used by the application programs 254, the operating system 252, the I/O device drivers 258, and other software programs that may reside in the memory 136. As discussed above, the data 256 may be stored at the portable electronic device, in a remote device/server or in a combination of the two without departing from the scope of the present invention.

As further illustrated in FIG. 2, according to some embodiments of the present invention, the application programs 254 include a monitoring module 265 and a feature/profile selection module 270. While the present invention is illustrated with reference to the monitoring module 265 and the feature/profile selection module 270 being application programs in FIG. 2, as will be appreciated by those of skill in the art, other configurations fall within the scope of the present invention. For example, rather than being application programs 254, these circuits and modules may also be incorporated into the operating system 252 or other such logical division of the system 268. Furthermore, while the monitoring module 265 and the feature/profile selection module 270 are illustrated in a single system 268, as will be appreciated by those of skill in the art, such functionality may be distributed across one or more systems. Thus, the present invention should not be construed as limited to the configuration illustrated in FIG. 2, but may be provided by other arrangements and/or divisions of functions between data processing systems. For example, although FIG. 2 is illustrated as having various circuits, one or more of these circuits may be combined without departing from the scope of the present invention.

In some embodiments of the present invention, the monitoring module 265 may be configured to monitor use of a portable electronic device by a user over a period of time. The period of time or "time window" can be any period of time that will produce meaningful data without departing from the scope of the present invention. Adaptive settings for features and/or profiles in the portable electronic device may be established based on the monitored use of the portable electronic device. In some embodiments of the present invention, the monitoring module 265 may be configured to monitor the use of the portable electronic device with respect to a location of the portable electronic device when used, a time of day that the portable electronic device is being used and/or a day of the week on which the portable electronic device is being used.

For example, the portable electronic device may be configured to determine a present location of the portable electronic device using for example a global positioning system (GPS) present in the portable electronic device or associated therewith. The use of GPSs in and with portable electronic devices is known to those having skill in the art and, therefore, the details will not be discussed herein. Features/profiles may be established based on the determined location of the portable electronic device. For example, if the user is at work and the number the user calls most often at work is the corporate voicemail, the corporate voicemail number may be placed first on the call list. Similarly, if the user is at home and the most used communication at home is email, email may be presented first on the display of the portable electronic device. Lists and displays may thus be ordered in terms of most to least used item at that location, corresponding to most to least likely to use at that location, thereby to make it probabilistically more convenient for the user to select the item desired. Lists and displays may also be so ordered in terms of most to least used item at a particular a time of day that the portable electronic device is being used, and/or a day of the week, and the like. Lists and displays may also be similarly ordered based on use for any combination of location, time of day, day of the week, and the like without departing from the scope of the present invention.

It will be understood that the features/profiles may adapt over time based on the monitored activity of the portable electronic device. For example, if the user begins to call home from work more than the user calls the corporate voicemail, the user's home phone number may be presented first instead of the corporate voicemail. Both an incidence number and a time period of adaptation may be configured so as to allow for quicker or slower adaptation, for example, slower adaptation requiring more incidences of the home number being used at work than quicker adaptation, and for example, slower adaptation being limited to fewer adaptations during an adaptation time period than quicker adaptation.

The feature/profile selection module 270 may be configured to establish the adaptive settings for the features and/or profiles in the portable electronic device based on the location of the portable electronic device when used, the time of day that the portable electronic device is being used and/or the day of the week on which the portable electronic device is being used. As illustrated in FIG. 2, the use data associated with the portable electronic device (PED) 259 may be stored in the portable electronic device.

According to some embodiments of the present invention, a user can define call management settings based on, for example, the location of the portable electronic device. For example, when a user is at work, the location being determined by the portable electronic device, calls from the user's personal address book entries may go to voicemail. Similarly, if a user is driving in a car, the portable electronic device may be configured to detect the speed using LBS and send all calls to voicemail and silence most non-critical alerts.

In some embodiments of the present invention, the monitoring module 265 is further configured to monitor use of one or more additional portable electronic devices by one or more additional users over the period of time. In these embodiments of the present invention, the feature/profile selection module 270 may be configured to establish adaptive settings for features and/or profiles in the portable electronic device based on the monitored use of the one or more additional portable electronic device. As illustrated in FIG. 2, the use data associated with the one or more additional portable electronic devices may be stored in the portable electronic device 260.

Figure 3:
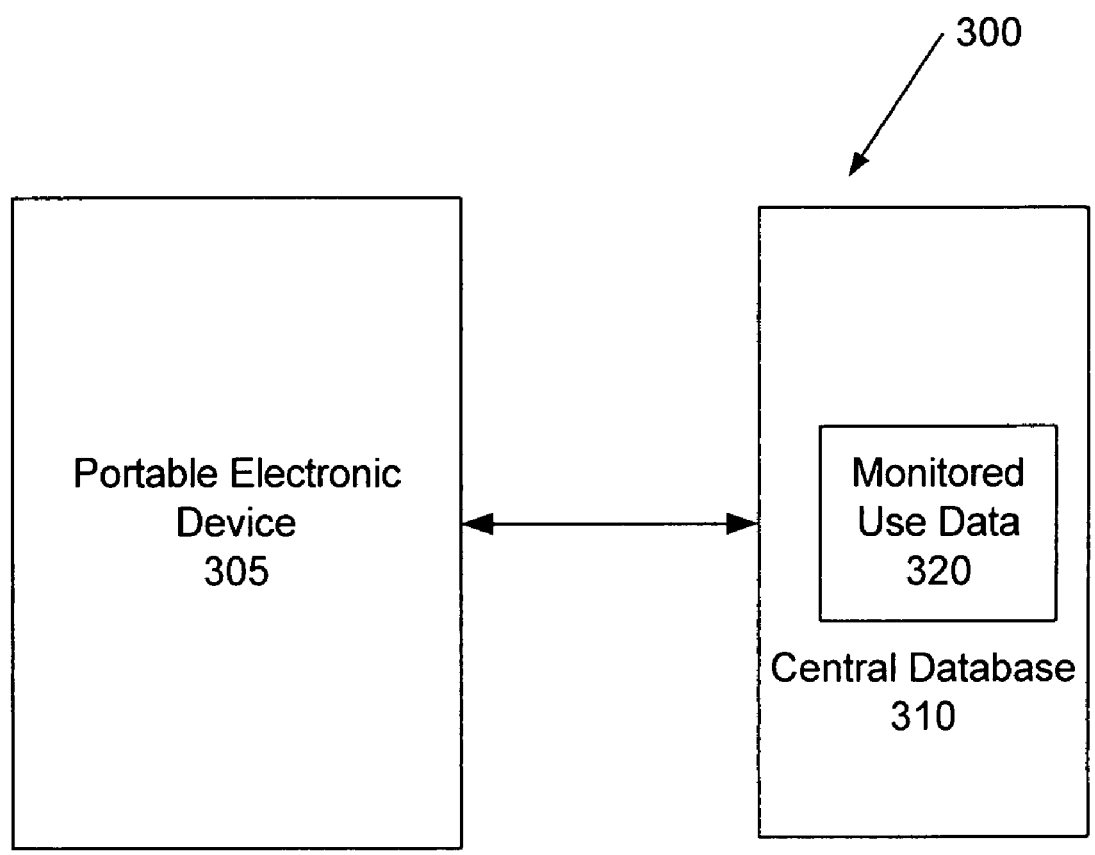
FIG. 3 is a block diagram illustrating a portable electronic device and a remote server according to some embodiments of the present invention.

As illustrated in FIG. 3, a system 300 according to some embodiments of the present invention may include portable electronic devices 305 in communication with a central sever 310. In these embodiments of the present invention, the monitored use data 320 associated with the user's portable electronic device and/or one or more additional portable electronic devices may be stored in a central database 310 accessible by a portable electronic device 305 without departing from the scope of the present invention.

Thus, according to some embodiments of the present invention, the features/profiles of the portable electronic device may be selected based on monitored use of the user's portable electronic device and/or other portable electronic devices. In some embodiments of the present invention, the feature/profile selection module 270 may be further configured to provide a plurality of suggestions associated with features and/or profiles of the portable electronic device to the user of the portable electronic device so as to allow the user to select a preferred feature and/or profile. In certain embodiments of the present invention, the plurality of suggestions associated with the features and/or profiles of the portable electronic device may be based on the monitored use of the portable electronic device and/or the monitored use of the one or more additional portable electronic devices. In further embodiments of the present invention, the plurality of suggestions associated with the features and/or profiles of the portable electronic device may be based on a current location of the portable electronic device.

For example, if the user enters a movie theater (the location being determined by the portable electronic device), the feature/profile selection module 270 may provide suggestions associated with the features/profiles of the phone, such as silent, vibrate and the like. Statistics may be provided associated with each of the suggestions, such as 90% of people who enter a movie theater silence their portable electronic device. The user may then select the preferred mode. In some embodiments of the present invention, the user may program the portable electronic device to automatically set the features/profiles of the portable electronic device to correspond to what the majority of people would do in the same situation and/or location, i.e. silence the portable electronic device in a movie theater.

Thus, according to some embodiments of the present invention, the feature/profile selection module 270 may learn and adapt based on the information obtained from the continuous monitoring of the portable electronic devices. Accordingly, the suggestions provided to the user are constantly being updated and/or improved based on the most recent acquired data.

In some embodiments of the present invention, the feature/profile selection module 270 may be configured to look up the user's current location using, for example, a geographic information system (GIS) and provide suggestions based on the user's current location. The GIS system is a location based server that may include maps of public transportation, churches, movie theaters and the like. The GIS system is provided herein for exemplary purposes only and, therefore, embodiments of the present invention should not be limited thereto.

Suggestions may be provided to the user using multiple methods. For example, a user may have a button on the portable electronic device that is dedicated to the suggestions. Thus, whenever the user wants to see the suggestions, the user can just press the dedicated suggestion button. In further embodiments, the suggestion box may automatically pop up for a predetermined period of time when the user arrives at a particular location prompting a suggestion, for example, a movie theater or church.

Figure 4:
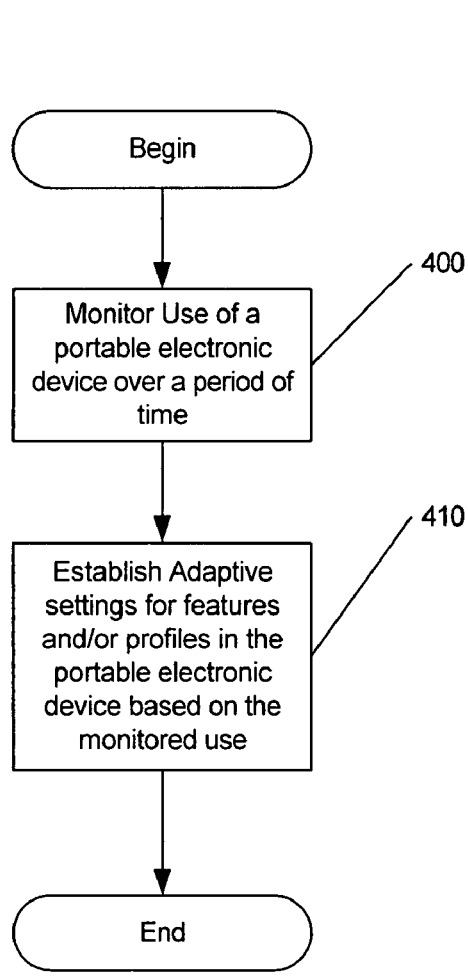
FIGS. 4 and 5 are flowcharts illustrating operations according to various embodiments of the present invention.

Various embodiments of the present invention will now be discussed with respect to the flowcharts of FIGS. 4 and 5. Referring first to the flowchart of FIG. 4, methods of managing features in a portable electronic device according to some embodiments of the present invention will be discussed. Operations begin at block 400 by monitoring use of a portable electronic device by a user over a period of time. As discussed above, any period of time may be used that would provide useful information without departing from the scope of the present invention. Adaptive settings for features and/or profiles in the portable electronic device may be based on the monitored use of the portable electronic device. For example, if a user of the portable electronic device calls his/her home phone number the most when the user is at work, the user's home phone number may be provided first in the user's call list. This information may be obtained by the constant monitoring and recording of the use of the portable electronic device over time.

Figure 5:
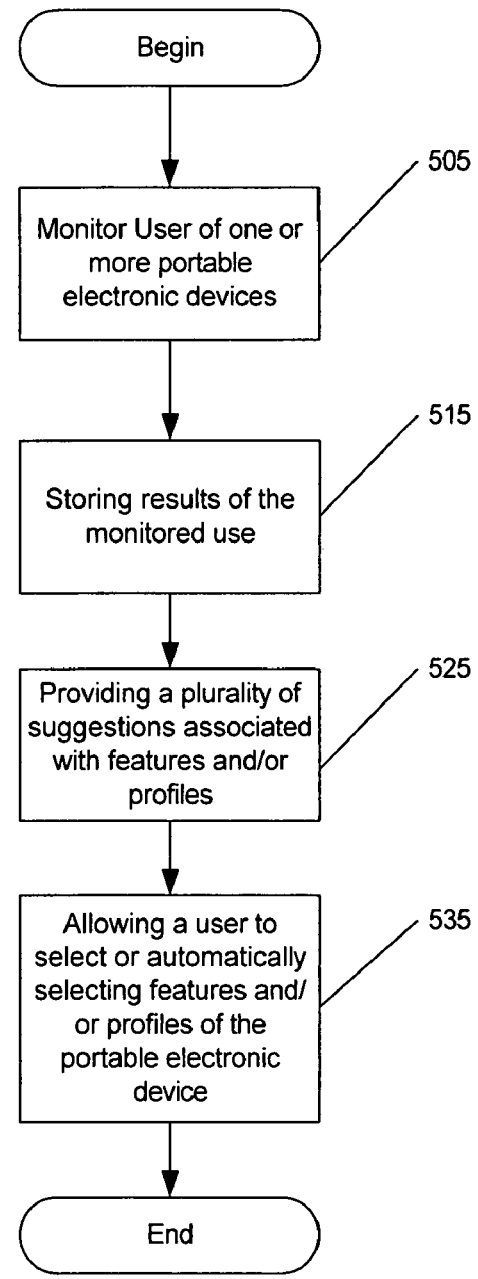

Referring now to the flowchart of FIG. 5, operations begin at block 505 by monitoring the use of one or more portable electronic devices over time. As discussed above, the time period over which the portable electronic devices are monitored is user customizable and only has to be long enough to provide useful information, such as a pattern of use based on user location, time of day, day of the week or the like. Note that multiple time periods or "windows" may be used, in that different time windows may provide better measurements for different types of information. The time period may also adapt in order to provide useful measurements as conditions change, for example, adapting via feedback methods well know in the art.

The use of the portable electronic device may be monitored with respect to, for example, a location of the portable electronic device when used, a time of day that the portable electronic device is being used and/or a day of the week on which the portable electronic device is being used. In these embodiments of the present invention, the adaptive settings may be established based on the location of the portable electronic device when used, the time of day that the portable electronic device is being used and/or the day of the week on which the portable electronic device is being used.

The results of the monitored user may be stored in ones of the portable electronic devices and/or in a central server accessible by the portable electronic devices (block 515). In some embodiments of the present invention, a plurality of suggestions associated with features and/or profiles of the portable electronic device may be provided to the user of the portable electronic device so as to allow the user to select a preferred feature and/or profile (block 525). In certain embodiments of the present invention, the plurality of suggestions associated with the features and/or profiles of the portable electronic device may be based on the monitored use of the portable electronic device and/or the monitored use of the at least one additional portable electronic device. In further embodiments of the present invention, the plurality of suggestions associated with the features and/or profiles of the portable electronic device may be based on a current location of the portable electronic device. A user may be allowed to select a feature/profile from the suggestions provide or the feature/profile may be automatically selected and changed (block 535).

In the drawings and specification, there have been disclosed embodiments of the invention and, although specific terms are employed, they are used in a generic and descriptive sense only and not for purposes of limitation, the scope of the invention being set forth in the following claims.

That which is claimed is:

1. A method, for managing a feature in a portable electronic device, comprising:
   monitoring use of the portable electronic device, wherein the use is associated with the feature in the portable electronic device;
   determining, based on the monitoring, a hierarchy for items pre-existing in the portable electronic device with respect to the feature, wherein the hierarchy is ordered from an item, of the pre-existing items, most used by a user of the portable electronic device (I) when the portable electronic device is at a particular location and (II) in a particular time window to an item, to an item, of the pre-existing items, least used by the user (I) at the particular location and (II) in the particular time window;
   determining a temporal match between a present time and the particular time window;
   determining a spatial match between a present location of the portable electronic device and the particular location;
   based on the hierarchy determined, the temporal match, and the spatial match, ordering the pre-existing items from a most-likely-to-be-used item, to a least-likely-to-be-used item, to create an ordered presentation associated with the feature; and
   initiating presentation to the user, by way of the portable electronic device, of the ordered presentation in association with the feature to make it more convenient, probabilistically, for the user to select a desired item of the ordered presentation;
   wherein the feature is:
   (i) associated with settings internal to the portable electronic device; and
   (ii) selected from a group of features consisting of:
      (a) a calendar feature internal to the portable electronic device;
      (b) an address book feature internal to the portable electronic device;
      (c) a voicemail feature internal to the portable electronic device;
      (d) a call feature internal to the portable electronic device; and
      (e) an email feature internal to the portable electronic device; and
      (f) a menu feature internal to the portable electronic device internal to the portable electronic device.

2. The method of claim 1, further comprising monitoring use of an additional portable electronic device, wherein the ordering is further based on results of monitoring use of the additional portable electronic device.

* * * * *